Oct. 23, 1962 P. E. OHMART ETAL 3,060,313
DENSITY RESPONSIVE APPARATUS HAVING
TEMPERATURE COMPENSATING MEANS
Filed March 12, 1958 3 Sheets-Sheet 1

INVENTORS.
Philip E. Ohmart.
BY Henry L. Cook, Jr.
Wood, Herron & Evans.
ATTORNEYS.

INVENTORS.
Philip E. Ohmart.
BY Henry L. Cook, Jr.
Wood, Herron & Evans.
ATTORNEYS.

3,060,313
DENSITY RESPONSIVE APPARATUS HAVING TEMPERATURE COMPENSATING MEANS
Philip E. Ohmart and Henry L. Cook, Jr., Cincinnati, Ohio, assignors to The Ohmart Corporation, Cincinnati, Ohio, a corporation of Ohio
Filed Mar. 12, 1958, Ser. No. 721,020
10 Claims. (Cl. 250—43.5)

This invention relates to apparatus for measuring or controlling physical characteristics of a liquid within a conduit or vessel, and is particularly directed to apparatus of this type employing a radiation responsive element such as an Ohmart cell, ionization chamber or the like.

There are many industrial processes in which it is necessary to determine some physical characteristic of a liquid confined within a pipe or vessel where conditions do not permit the use of mechanical measuring equipment. Many different systems have been proposed for making these measurements by passing penetrating radiation such as gamma rays through the liquid where a portion of the radiation is absorbed. That portion of the radiation which passes through the liquid is measured by means of a suitable detector such as an ionization chamber, or Ohmart cell.

The details of one suitable form of density responsive apparatus embodying an Ohmart cell as a detector are shown in Philip E. Ohmart United States Patent No. 2,737,592 for "Density Responsive Apparatus." If an Ohmart cell is employed as the detector, a minute current is generated which current varies in accordance with variations in the density of the fluid within the conduit or vessel. If an ionization chamber is used as a detector, the chamber functions as a variable resistance which permits current to flow from a power source through a load circuit in accordance with the density of the fluid being measured. With either type of detector the output current is amplified and used to operate a recorder, meter, or electrically responsive control device such as a valve.

The principal object of the present invention is to provide automatic temperature compensating means effective to modify the output signal of the detector so that the signal applied to an amplifier is precorrected for temperature changes in the material and the density indicated by the recorder or meter is the density of the process material referred to a preselected reference temperature irrespective of the actual temperature of the process material when measured. In order to provide a better understanding of the invention it will be discussed in relation to a system for measuring concentration of a liquid and a system for measuring density.

It is not uncommon that the primary quantity in which a user is ultimately interested is not the density but rather the concentration of a liquid; for example, the concentration of hydrochloric acid in a water solution. This concentration is correlated with the density or specific gravity of the solution so that the current output of the detector, which varies with density can be amplified and used to operate a meter or recorder calibrated directly in terms of concentration. However, the density of most materials varies appreciably with changes in temperature of the material so that a measurement of the density of a material does not always give a completely accurate indication of the concentration of the material. For example, a material of given concentration at 80° F. may have a specific gravity of 1.03; while at 160° F. this material at the same concentration may have a specific gravity of 1.01. It will readily be appreciated that if a radiation detector is connected to a meter which is properly calibrated to give an accurate reading of concentration at 80° F., the same meter will give an erroneous indication of concentration, if during the process the material being treated is raised to a temperature of 200° F.

When a measuring system constructed in accordance with the present invention is used for measuring concentration, it includes means for developing "correcting" electrical current having a magnitude correlated with the change in density of a material of constant concentration due to a change in temperature of the material from a base or reference temperature. This minute corrective current is added or subtracted to the current produced by the detector so that the final output current of the device which is ultimately amplified to operate the reader or recorder reflects only changes in concentration of the material and is not in any way affected by changes in material density due to temperature variations.

More particularly, a density responsive system constructed in accordance with the principles of the present invention compresses a source of radioactive material effective to project radiations through at least a portion of the liquid confined within a vessel or pipe. A detector such as an Ohmart cell, or an ionization chamber, provided with a suitable source of potential, is aligned with the radioactive source so that a portion of the radiation passing through the fluid impinges upon the detector. Either detector is effective to cause a current flow which varies directly with the density of the material being measured. In addition to a detector, the present measuring device comprises apparatus for causing a current flow which is correlated with the change in specific gravity of the material due to a change in temperature.

One suitable form of temperature compensating apparatus comprises a regulated D.C. power supply adapted to pass current through a temperature responsive resistance. The voltage drop across the resistance is converted to a "correcting" current which is added to the current output of the radiation detector. This correcting current cancels out that portion of the detector current which is due to temperature change of the material; and this provides a total output current which varies only with the concentration of the material. This current is applied to a suitable amplifier and the output of the amplifier is used to operate suitable recording or controlling apparatus.

In a preferred embodiment the temperature responsive resistance constitutes one arm of a bridge. This bridge also includes two manually adjustable potentiometers which as explained below, provide ready means for setting up the apparatus for use with any material operated under any temperature conditions.

One of the principal advantages of the present system is that it provides ready means for obtaining extremely accurate measurement or control of the concentration of a fluid undergoing substantial temperature changes. Furthermore, the present measuring system is adapted to give automatically a reading of density or specific gravity referred to a preselected base temperature. In the past, when liquid samples were drawn off to make density measurements in a laboratory, these measurements were made with the material at some reference temperature, frequently 60° F. It will be appreciated that the density of the material at this temperature is appreciably different from its density at an elevated process temperature such as 180° F. However, by means of the present invention it is possible to obtain instantaneous density measurements which are automatically corrected to the reference temperature even though the measurements themselves are made at a different temperature.

A still further advantage of the present invention is that the same apparatus can be used to measure characteristics of many different materials processed at various temperatures. Moreover, it is a relatively simple matter to set up the present equipment for operation. More particularly, the present device has two controls; one control is set in accordance with the characteristics of the material being processed and the other is set in accordance with a selected reference temperature. In the preferred embodiment, one of these controls is a potentiometer forming one element of the bridge circuit, while the other control is a potentiometer in the voltage source circuit of the bridge.

The present invention further contemplates two modifications of the apparatus in which different means are provided for developing a correcting current. Each of the modified forms of apparatus possesses the advantages of the preferred embodiment; and in addition, is further advantageous for use in installations, involving extremely high temperatures, since the use of a temperature sensitive resistor is eliminated.

More particularly, in one modification the correcting current is generated by a compensating Ohmart cell connected in parallel opposition to the measuring cell as explained in United States Patent No. 2,763,790 for "Comparator." This modification, which is used when the fluid is enclosed and the space above the fluid is subjected to pressure variations corresponding to changes of temperature in the fluid, comprises an expandable bellows, or a Bourdon gage having a movable tube communicating with the pressure space above the liquid. The free end of the bellows or Bourdon gage is mechanically interconnected to a radioactive source associated with the compensating cell. As the pressure changes, the geometry, or position of the radioactive source, changes relative to the cell so that the current produced by the cell varies in accordance with the temperature of the liquid. This current modifies the current output of the detector before amplification and provides a temperature correction in exactly the same manner as the signal produced by the bridge circuit in the first described embodiment.

In a second modified form of the apparatus, a thermocouple is exposed to the temperature of the fluid being measured. This thermocouple which generates a minute current variable with the temperature of the material, is connected to the detector and modifies the current output of the detector prior to amplification to provide a correction for temperature changes in the manner described above.

Each of the modified forms of apparatus includes means for readily adjusting the apparatus for use with any particular material and any desired reference temperature. As explained below, in the first modification, the reference temperature is selected by shifting the initial position of the radioactive source relative to the compensating cell. In this embodiment, adjustment is made for the temperature coefficient characteristic of the particular material being measured by varying the linkage interconnecting the Bourdon element and source to vary the displacement of the source for a given temperature change.

In the third embodiment, the reference temperature is selected and an adjustment is made in accordance with the temperature coefficient of the material by varying the tap positions on two potentiometers.

These and other objects and advantages of the present invention will be more readily apparent from a consideration of the following detailed description of the drawings illustrating preferred embodiments of the invention.

Figure 1:
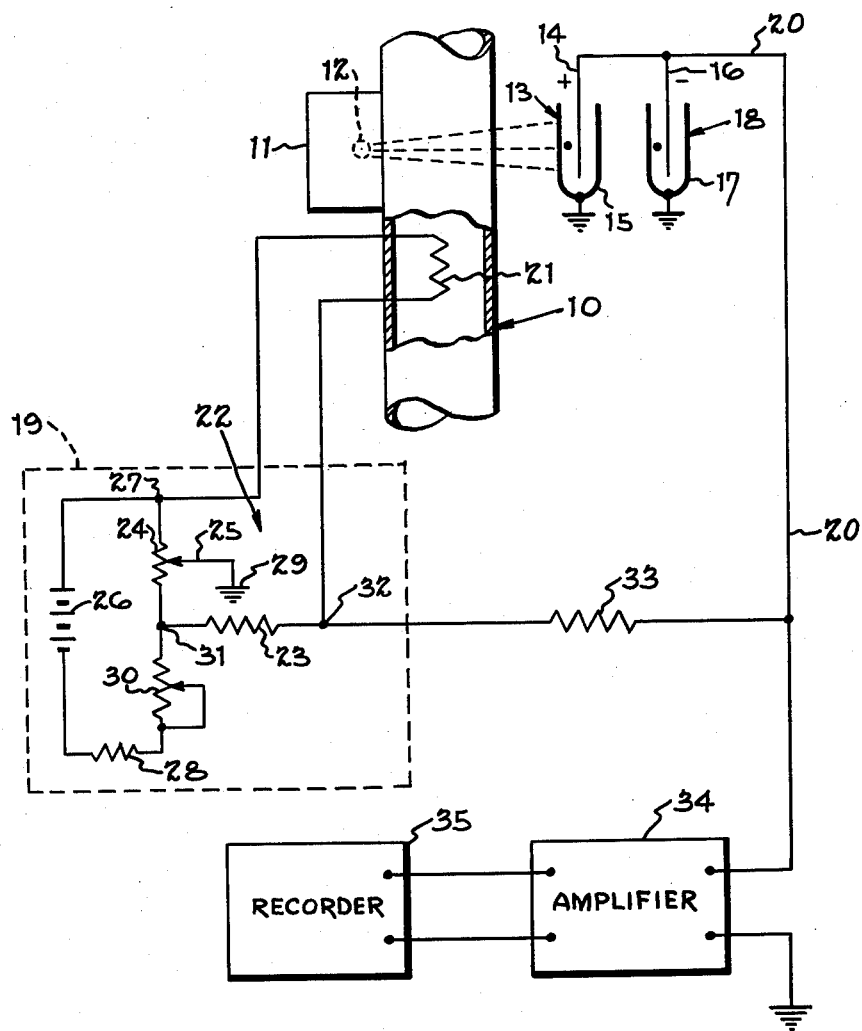
FIGURE 1 is a diagrammatic view showing one preferred form of apparatus constructed in accordance with the present invention.

FIGURE 1 illustrates a typical measuring system constructed in accordance with the present invention. It is to be understood that the system shown is only illustrative and that from the above discussion of the general principles of the present invention and the following detailed description of several embodiments; those skilled in the art, will readily comprehend various modifications to which the invention is susceptible. Thus, for example, while the specific embodiment shown employs Ohmart cells as a detector, it is contemplated that these cells may be replaced by ionization chambers or other suitable detectors coupled to a suitable source of power. Moreover, while in the embodiment shown the output of the amplifier is used to drive a recorder, the amplifier can be connected to a meter, or to an automatic control device such as an electrically responsive valve or the like or to any combination of these devices.

As shown in FIGURE 1, one typical measuring system of the present invention is employed to measure concentration of a liquid confined within a conduit 10. The measuring system includes a housing, or shield 11 containing a quantity of radioactive material 12 mounted upon one wall of conduit 10. A measuring Ohmart cell, or radiant energy electric generator 13 is mounted adjacent to conduit 10 remote from source 12 so that a portion of the radiation emitted by source 12 and passing through the liquid within conduit 10 impinges upon cell 13. The details of construction of one suitable Ohmart cell are shown in the above identified copending application. These details of construction constitute no part of the present invention. It will suffice here to state that Ohmart cell 13 comprises two electrodes 14 and 15 of chemically dissimilar materials in contact with an ionizable gas. Positive electrode 14 and negative electrode 15 are respectively connected to negative and positive electrodes 16 and 17 of compensating radiant energy electric generator or Ohmart cell 18. As explained in my above identified patent application these two cells cooperate to provide a current output signal in line 20 the magnitude of which is correlated with the density of the liquid within conduit 10.

In addition to a detector such as Ohmart cells 13 and 18 the present measuring system comprises a temperature compensating circuit indicated generally by dotted lines 19 and including a temperature sensitive resistance 21, such as a Brown resistance thermometer. This temperature sensitive resistor is preferably placed in a well or the like disposed within conduit 10 closely adjacent to Ohmart cell 13. Alternatively, resistor 21 can be in the form of a ribbon resistor wrapped on the outside of pipe. The value of this resistor varies in accordance with temperature changes of the fluid within the conduit.

Temperature responsive resistor 21 is part of a bridge circuit 22 of the temperature compensating means. Bridge circuit 22 includes a fixed resistance 23 and a potentiometer 24 having a movable contact 25. As explained below, potentiometer 24 provides means for setting the reference temperature upon which the measurements of process material concentration will be based. The positive terminal of a regulated source of D.C., diagrammatically indicated by battery 26, is connected to junction 27 between the temperature responsive resistance 21 and reference temperature control potentiometer 24. The other terminal of this power supply is connected through fixed resistance 28 and potentiometer 30 to junction 31 between potentiometer 24 and resistance 23. It is to be understood that the polarity of battery 26 can be reversed to reverse the polarity of the temperature correcting signal if desired. As explained below, potentiometer 30 provides means for adjusting the circuit in accordance with the physical characteristics, or more specifically in this installation the change in specific gravity per degree F. of the process material. Contact 25 is grounded as at 29 and establishes one point of zero potential in the bridge. When the bridge is in balance, the potential at junction 32 between temperature responsive resistance 21 and fixed resistance 23 is also zero. However, when the bridge is out of balance, indicating that the temperature at resistance 21 differs from the reference temperature, a potential appears at junction 32. This potential is of one polarity if the temperature is above the reference temperature and is of the opposite polarity if the temperature is below the reference temperature. Junction 32 is connected to a high ohmic resistor 33. The output current of cells 13 and 18 the "correcting" current flowing through resistor 33 are added together and applied to amplifier 34. The output leads of this amplifier are connected to recorder 35; however as explained above the amplifier can also be employed to drive a meter or electrically responsive control devices if desired.

To understand the operation of the present system suppose that it is desired to measure the concentration of hydrochloric acid within a concentration of from 20 to 40 percent. The specific gravity of hydrochloric acid at a reference temperature of 80° F. varies from 1.098 at a 20 percent concentration to 1.198 for a 40 percent concentration. It has been determined that the "process material temperature coefficient" of hydrochloric acid, that is the change in specific gravity per degree F. is minus .00025. Thus, if the hydrochloric acid remains at a constant concentration but its temperature is increased from 80° F. to 100° F., the specific gravity is lowered by 20 times .00025 or .005. Consequently, if the gage is correctly calibrated for 80°, at 100° the density measurement would be an error by minus .005 unit of specific gravity or the concentration reading would be an error by one percent. The function of the temperature compensation control under these conditions is to develop and supply a correction current of the correct magnitude and polarity to cancel out the current flow caused by a change of specific gravity of .005.

In order to install the present apparatus, the radioactive source and cells are first mounted upon opposite sides of the conduit and the various electrical components are wired together. The temperature compensation portion of the circuit is disconnected so that no current flows from resistor 33 and line 20 to amplifier 34. The recorder is then calibrated using known specific gravity solutions in the process line.

Next the detector, in this case the opposed parallel combination of measuring and compensating cells 13 and 18, is disconnected from amplifier 34. The resistance bulb, or temperature resistance 21 is then heated to the desired reference temperature by immersing the bulb in a bath at that temperature for a substantial length of time until the bulb reaches temperature equilibrium. Thereafter, the reference temperature control potentiometer 25 is adjusted so that the amplifier reading is zero. Finally, resistance 21 is immersed in fluid at a higher temperature such as 100°. With resistance 21 at this temperature, the temperature coefficient potentiometer is adjusted so that the amplifier meter indicates an increase of .005 unit of specific gravity, or under the conditions described 5 percent of the full scale deflection.

An alternative procedure for adjusting the temperature control when the immersion of resistance 21 in a constant temperature bath is inconvenient, involves the use of a resistance box having 100, 10, 1 and .1 ohm steps. This resistance box is connected in a conventional manner in place of resistance 21, the resistance of the box being set in accordance with the corresponding resistance of resistor 21 at the temperature condition to be simulated. The resistance values for resistor 21 at various temperatures can readily be obtained from a table supplied by the manufacturer. Thus for one form of resistance 21, it is known that its resistance at 80° F. is 572.0 ohms. Consequently, the resistance box is adjusted to provide a resistance of this value when the temperature compensation circuit is initially set up and reference temperature potentiometer 24 is adjusted. In order to determine the proper setting of temperature coefficient control potentiometer 30, the value of the resistance box is changed to the corresponding value of resistance 21 at 100° F. or 600.2 ohms, the remaining steps of calibration remaining the same.

In the embodiment shown, recorder 35 preferably records concentration on suitably calibrated charts. Cells 13 and 18 produce an electrical signal which varies in accordance with the density of liquid within conduit 10. It will be appreciated that as the temperature rises, if the concentration of the liquid remains constant, the liquid will become less dense and less radiation will be absorbed. Consequently, the output of measuring cell 13 will increase relative to the output of compensating cell 18 so that a positive signal is applied to line 20. Simultaneously however, the temperature of resistor 21 is raised, raising its resistance. This causes the potential at junction 32 to be lowered so that a negative signal is applied to resistor 33 and a "correcting" current is generated which is of equal magnitude and opposite polarity to the current generated by the cells due to the changed density of the processed material. Consequently, the signal received by amplifier 34 and recorder 35 is correlated with changes in density, or specific gravity, of the process material due to changes in concentration but not due to changes in temperature.

Another use for the present measuring system is in an installation in which it is desired to read out the density, or specific gravity of a material referred to a preselected reference, or base, temperature. Thus many of the tables and available process data refer to density measurements made at 60° F., 20° C. or other fixed temperatures. The present apparatus provides means for directly reading what the density of the processed material would be at this reference temperature even though the density of the material is actually measured at a different temperature, 500° F. for example.

To provide such a measurement the present apparatus is installed in the manner described above with potentiometer 24 being adjusted to provide zero signal output when resistor 21 is immersed in a bath at the desired reference temperature, such as 60° F. The operation of the device is exactly as described above except that recorder 35 uses charts calibrated directly in terms of density or specific gravity instead of percent solution.

Figure 2:
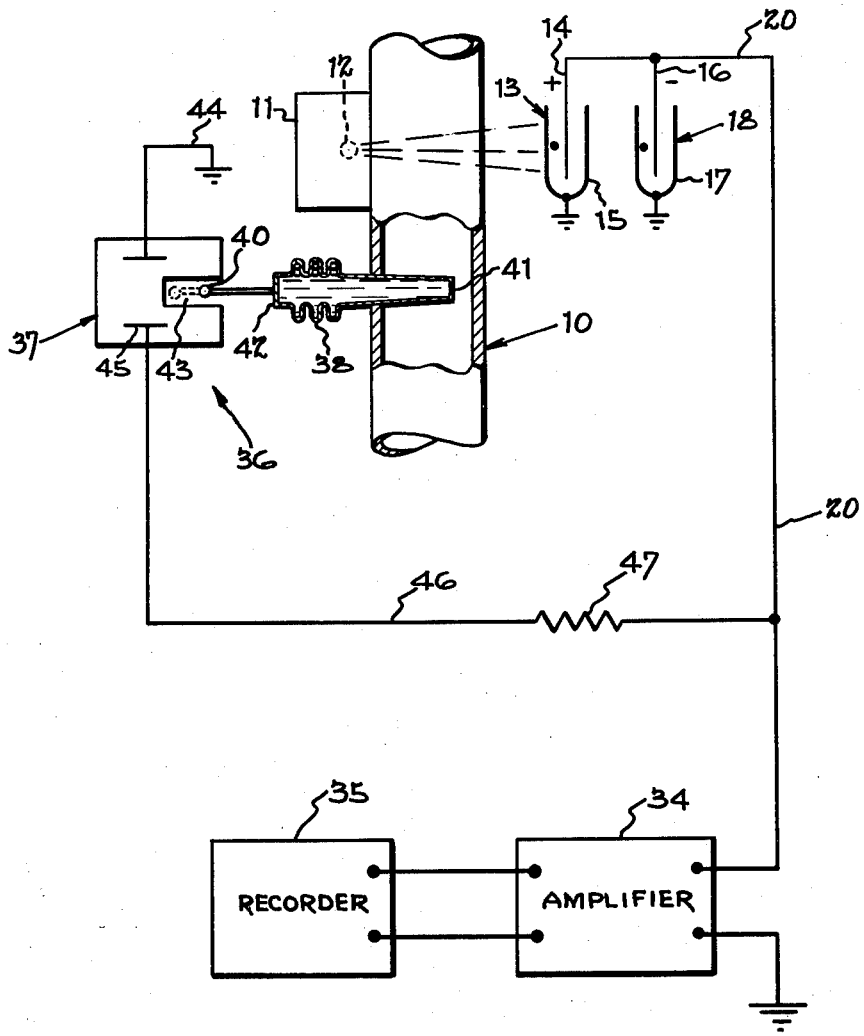
FIGURE 2 is a diagrammatic view similar to FIGURE 1 of a modified form of apparatus employing a movable source in connection with a compensating cell.

A modified form of apparatus including temperature compensating means is shown in FIGURE 2. As there shown, a conduit 10 encloses a fluid being measured by a system including a radioactive source 12, a measuring cell 13, and a compensating cell 18. Cells 13 and 18 are connected in parallel opposed relationship and are connected to an amplifier 34 as explained above. Amplifier 34 is in turn connected to a recorder 35, or alternatively to an electrical response valve or the like.

In addition to these elements, the measuring system includes means for generating a correcting current variable in accordance with the temperature of fluid in conduit 10. This correcting current generating means indicated generally at 36 comprises a "correcting" Ohmart cell 37, an expandable member such as bellows 38, and a source of radioactive material 40 shiftable in response to movement of the bellows. It is to be understood that while in the embodiment shown cells 37 and 18 are separate cells, a single cell can be constructed and employed to perform the compensating and temperature correcting functions. More particularly, in the embodiment shown, bellows 38 is filled with a liquid having a high coefficient of expansion and includes a portion 41 in contact with the fluid within conduit 10. The bellows includes a free, or movable end 42 shiftable upon expansion or contraction of the liquid within the bellows. Free end 42 carries, or is mechanically interconnected to, a radioactive source 40, disposed within a well 43 in correcting cell 37. The position of the radioactive source relative to the cell is thus varied in accordance with the temperature of the liquid within conduit 10. Correcting cell 37 includes two dissimilar electrodes, one of which is grounded as at 34, while the second electrode 45 of the cell is connected through lead 46 and resistor 47 to input lead 20 of amplifier 34.

In operation, the current produced by correcting cell 37 varies with the position of radioactive source 40 and consequently with the temperature of the liquid within conduit 10. The correcting current generated by cell 37 modifies the current signal applied to amplifier 34 from cells 13 and 18 to cancel out the effect of changes in the temperature of the process material upon the current generated by measuring cell 13. In this embodiment the reference temperature adjustment is made by shifting in any suitable manner, the initial position of the radioactive source relative to connecting cell 37. Adjustment is made for the temperature coefficient characteristic of the process material by varying the linkage between bellows 38 and source 40, so that the distance the source is moved for a given temperature change of the material is varied.

In a somewhat similar modification, utilizing a mechanical temperature sensing element, a bellows, or Bourdon gage is connected to the movable tap of a potentiometer which replaced resistor 21 in the embodiment shown in FIGURE 1. In such a modification, the voltage drop across the potentiometer varies with the temperature of the material. This potentiometer cooperates with the other elements of the bridge circuit to produce a correcting current as explained above.

Figure 3:
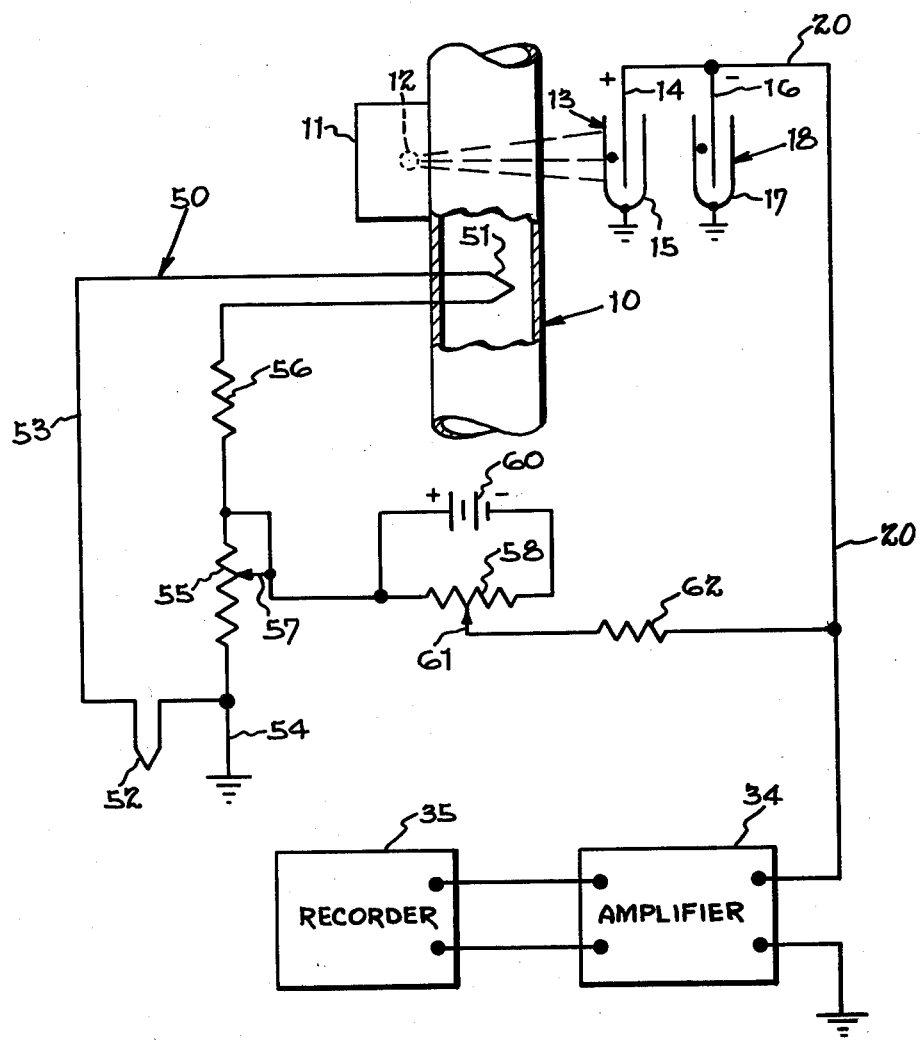
FIGURE 3 is a diagrammatic view similar to FIGURE 1 of another modified form of apparatus employing a thermocouple.

Another modified form of temperature compensating system is shown in FIGURE 3. In the system there shown, the process fluid is contained within conduit 10 and is subject to radiation from a source 12. The radiation which penetrates the fluid impinges upon a measuring cell 13. The cell is connected in parallel opposed relation to a compensating cell 18 and to an amplifier 34. As in the first embodiment, amplifier 34 operates a recorder or other electrically responsive device 35. The measuring system shown in FIGURE 3 further includes a temperature correcting circuit 50 comprising a thermocouple having a hot junction 51 in contact with the process material within conduit 10 and a cold or reference junction 52. One terminal of each of the junctions of the thermocouple are connected through lead 53. The opposite terminal of junction 52 is grounded as at 54 and is connected to the corresponding terminal of junction 51 through a temperature coefficient control potentiometer 55 and resistor 56. Potentiometer 55 includes a movable tap 57 which is connected to one terminal of a reference temperature control potentiometer 58. A D.C. power source, indicated diagrammatically by batteries 60 is shunted across the coil of potentiometer 58. This potentiometer is provided with a tap 61 which is connected through resistor 62 to input lead 20 of amplifier 34.

In this embodiment, the thermocouple generates a current which varies with the temperature of the process material in conduit 10. The signal generated by the thermocouple is taken from tap 57 of potentiometer 55, this tap being adjusted in accordance with the temperature coefficient of the process material as explained above. Tap 57 is in turn connected to the coil of potentiometer 58. Tap 61 of this potentiometer is adjusted in accordance with the desired reference temperature and is in turn connected through resistor 62 to amplifier 34 so that a correcting signal is applied to the amplifier which varies in accordance with the temperature changes of the process material as explained above.

Having described our invention, we claim:

1. Density responsive apparatus comprising first circuit means for producing an electrical current correlated with the density of a material, and second circuit means for producing a correcting current of the same magnitude and opposite polarity as the current produced by the first circuit means in response to a change in density of the material due to the temperature differential between the temperature of the material and a preselected reference temperature, said first circuit means including a radiation detector, said second circuit means including a temperature sensitive variable resistance element responsive to the temperature of said material adjacent to said detector.

2. Density responsive apparatus comprising first circuit means for producing an electrical current correlated with the density of a material, and second circuit means for producing a correcting current of the same magnitude and opposite polarity as the current produced by the first circuit means in response to a change in density of the material due to the temperature differential between the temperature of the material and a preselected reference temperature, said second circuit means including a temperature sensitive resistance element responsive to the temperature of said material, a first variable impedance for selecting the desired reference temperature, and a second variable impedance, said second variable impedance being set in accordance with the rate of change of density of the material with changes in temperature.

3. Density responsive apparatus comprising first circuit means for producing an electrical current correlated with the density of a material, and second circuit means for producing a correcting current of the same magnitude and opposite polarity as the current produced by the first circuit means in response to a change in density of the material due to temperature differential between the temperature of the material and a preselected reference temperature, said second circuit means including a bridge, and a temperature sensitive resistance forming part of said bridge.

4. Density responsive apparatus comprising first circuit means for producing an electrical current correlated with the density of a material, and second circuit means for producing a correcting current of the same magnitude and opposite polarity as the current produced by the first circuit means in response to a change in density of the material due to the temperature differential between the temperature of the material and a preselected reference temperature, and a variable resistance having a grounded tap forming another part of said bridge.

5. Density responsive apparatus comprising first circuit means for producing an electrical current correlated with the density of a material, and second circuit means for producing a correcting current of the same magnitude and opposite polarity as the current produced by the first circuit means in response to a change in density of the material due to the temperature differential between the temperature of the material and a preselected reference temperature, said second circuit means including a bridge comprising a fixed resistance, a potentiometer having a grounded tap and a temperature sensitive resistance, a source of potential for said bridge; and a variable impedance interconnecting said potential source and said bridge.

6. In density responsive apparatus, means for correcting for changes in density of a material due to its deviation from a reference temperature, said means comprising a bridge circuit including a temperature sensitive resistance in contact with said material, and a potentiometer for selecting said reference temperature, a source of potential for said bridge, and a variable impedance interconnecting said bridge and said potential source.

7. Apparatus for measuring the density of material, said apparatus comprising a source of radiation disposed to project radiation through said material, a detector disposed in the path of radiation passing through said material, said detector being effective to produce an electrical current flow correlated with the density of said material, temperature compensating means for generating a current of equal magnitude and opposite polarity to the current produced by said detector due to the change in density of the material caused by the difference between the material temperature and a preselected reference temperature, said temperature compensating means comprising a source of direct current, a potentiometer in electrical connection with said source of direct current, a bridge in circuit connection with said potentiometer and said source of direct current, said bridge including a fixed resistance, a temperature sensitive resistance exposed to the temperature of said material, and a potentiometer, said potentiometer having a grounded tap, and being connected between said fixed resistance and said temperature responsive resistance, and a lead interconnecting said detector and one lead of said temperature responsive resistance.

8. Density responsive apparatus comprising first circuit means for producing an electrical current correlated with the density of a material, and second circuit means for producing a correcting current of the same magnitude and opposite polarity as the current produced by the first circuit means in response to a change in density of the material due to the temperature differential between the temperature of the material and a preselected reference temperature, said first circuit means including a radiation detector, said second circuit means including a thermocouple having one junction disposed adjacent to said detector, whereby the current generated by said detector is responsive to the temperature of said material adjacent to said detector.

9. Density responsive apparatus comprising first circuit means for producing an electrical current correlated with the density of a material, and second circuit means for producing a correcting current of the same magnitude and opposite polarity as the current produced by the first circuit means in response to a change in density of the material due to the temperature differential between the temperature of the material and a preselected reference temperature, said second circuit means including a thermocouple having one junction disposed adjacent to said detector, whereby the current generated by said detector is responsive to the temperature of said material adjacent to said detector, a first variable impedance for selecting the desired reference temperature, and a second variable impedance, said second variable impedance being set in accordance with the rate of change of density of the material with changes in temperature.

10. Density responsive apparatus comprising first circuit means for producing an electrical current correlated with the density of a material, and second circuit means for producing a correcting current of the same magnitude and opposite polarity as the current produced by the first circuit means in response to a change in density of the material due to the temperature differential between the temperature of the material and a preselected reference temperature, said first circuit means including a radiation detector, said second circuit means including a correcting radiant energy electric generator, an expandable member having one portion disposed in thermal contact with said material adjacent to said detector, a source of radioactive material disposed adjacent to said radiant energy electric generator, and means mechanically interconnecting said source with said expandable element, whereby said source is shifted relative to said radiant energy electric generator in accordance with the temperature of said material adjacent to said detector.

References Cited in the file of this patent

UNITED STATES PATENTS

| | | |
|---|---|---|
| 2,613,326 | Herzog | Oct. 7, 1952 |
| 2,789,230 | Hutchins | Apr. 16, 1957 |
| 2,800,591 | Gilman | July 23, 1957 |
| 2,883,555 | London | Apr. 21, 1959 |
| 2,919,351 | Swift | Dec. 29, 1959 |
| 2,968,727 | Otis | Jan. 17, 1961 |

FOREIGN PATENTS

| | | |
|---|---|---|
| 1,062,006 | France | Apr. 16, 1954 |